(12) United States Patent
Edelsburg et al.

(10) Patent No.: US 11,996,113 B2
(45) Date of Patent: May 28, 2024

(54) VOICE NOTES WITH CHANGING EFFECTS

(71) Applicant: Snap Inc., Santa Monica, CA (US)

(72) Inventors: Alex Edelsburg, Seattle, WA (US); Kyle Goodrich, Venice, CA (US); Pedram Javidpour, Los Angeles, CA (US); Andrew James McPhee, Culver City, CA (US); Daniel Moreno, Los Angeles, CA (US); Jeremy Baker Voss, Los Angeles, CA (US)

(73) Assignee: Snap Inc., Santa Monica, CA (US)

( * ) Notice: Subject to any disclaimer, the term of this patent is extended or adjusted under 35 U.S.C. 154(b) by 260 days.

(21) Appl. No.: 17/514,439

(22) Filed: Oct. 29, 2021

(65) Prior Publication Data

US 2023/0135516 A1  May 4, 2023

(51) Int. Cl.
*H04L 51/04* (2022.01)
*G06F 3/0482* (2013.01)
(Continued)

(52) U.S. Cl.
CPC .......... *G10L 21/013* (2013.01); *G06F 3/0482* (2013.01); *G06F 3/04883* (2013.01); *G06F 3/165* (2013.01); *G06T 13/00* (2013.01)

(58) Field of Classification Search
None
See application file for complete search history.

(56) References Cited

U.S. PATENT DOCUMENTS 5,880,731 A   3/1999 Liles et al.
6,023,270 A   2/2000 Brush, II et al.
(Continued)

FOREIGN PATENT DOCUMENTS

CN   109863532   6/2019
CN   110168478   8/2019
(Continued)

OTHER PUBLICATIONS

Screen captures from YouTube video clip entitled "How to Use Animoji" 4 pages, uploaded Nov. 6, 2017 by user "TheUnlockr." Retrieved from the internet: https://www.youtube.com/watch?v=Sa9QKq09JoY (Year: 2017).*
(Continued)

*Primary Examiner* — Matthew Ell
*Assistant Examiner* — Samuel Shen
(74) *Attorney, Agent, or Firm* — Schwegman Lundberg & Woessner, P.A.

(57) ABSTRACT

Methods and systems are disclosed for generating voice notes. In one embodiment, a messaging application implemented on a first participant computing device, receives a request to send a voice message to a second participant computing device in a communication session. In response to receiving the request, the messaging application selects a voice modification effect. The messaging application receives input to begin recording the voice message. While the voice message is being recorded, the messaging application receives speech input, modifies the speech input based on the voice modification effect in real time, and continuously updates an audio file with the modified speech input. In response to receiving input to terminate recording the voice message, the messaging application provides a first option to playback the audio file and a second option to send the audio file as the voice message to the second participant computing device.

20 Claims, 11 Drawing Sheets

(51) Int. Cl.
  *G06F 3/04883*   (2022.01)
  *G06F 3/16*      (2006.01)
  *G06T 13/00*     (2011.01)
  *G10L 21/013*    (2013.01)
  *H04L 51/10*     (2022.01)

(56) References Cited

U.S. PATENT DOCUMENTS

| | | |
|---|---|---|
| 6,223,165 B1 | 4/2001 | Lauffer |
| 6,772,195 B1 | 8/2004 | Hatlelid et al. |
| 6,842,779 B1 | 1/2005 | Nishizawa |
| 7,342,587 B2 | 3/2008 | Danzig et al. |
| 7,468,729 B1 | 12/2008 | Levinson |
| 7,636,755 B2 | 12/2009 | Blattner et al. |
| 7,639,251 B2 | 12/2009 | Gu et al. |
| 7,775,885 B2 | 8/2010 | Van et al. |
| 7,859,551 B2 | 12/2010 | Bulman et al. |
| 7,885,931 B2 | 2/2011 | Seo et al. |
| 7,925,703 B2 | 4/2011 | Dinan et al. |
| 8,088,044 B2 | 1/2012 | Tchao et al. |
| 8,095,878 B2 | 1/2012 | Bates et al. |
| 8,108,774 B2 | 1/2012 | Finn et al. |
| 8,117,281 B2 | 2/2012 | Robinson et al. |
| 8,130,219 B2 | 3/2012 | Fleury et al. |
| 8,146,005 B2 | 3/2012 | Jones et al. |
| 8,151,191 B2 | 4/2012 | Nicol |
| 8,384,719 B2 | 2/2013 | Reville et al. |
| RE44,054 E | 3/2013 | Kim |
| 8,396,708 B2 | 3/2013 | Park et al. |
| 8,425,322 B2 | 4/2013 | Gillo et al. |
| 8,458,601 B2 | 6/2013 | Castelli et al. |
| 8,462,198 B2 | 6/2013 | Lin et al. |
| 8,484,158 B2 | 7/2013 | Deluca et al. |
| 8,495,503 B2 | 7/2013 | Brown et al. |
| 8,495,505 B2 | 7/2013 | Smith et al. |
| 8,504,926 B2 | 8/2013 | Wolf |
| 8,559,980 B2 | 10/2013 | Pujol |
| 8,564,621 B2 | 10/2013 | Branson et al. |
| 8,564,710 B2 | 10/2013 | Nonaka et al. |
| 8,581,911 B2 | 11/2013 | Becker et al. |
| 8,597,121 B2 | 12/2013 | Andres del Valle |
| 8,601,051 B2 | 12/2013 | Wang |
| 8,601,379 B2 | 12/2013 | Marks et al. |
| 8,632,408 B2 | 1/2014 | Gillo et al. |
| 8,648,865 B2 | 2/2014 | Dawson et al. |
| 8,659,548 B2 | 2/2014 | Hildreth |
| 8,683,354 B2 | 3/2014 | Khandelwal et al. |
| 8,692,830 B2 | 4/2014 | Nelson et al. |
| 8,810,513 B2 | 8/2014 | Ptucha et al. |
| 8,812,171 B2 | 8/2014 | Filev et al. |
| 8,832,201 B2 | 9/2014 | Wall |
| 8,832,552 B2 | 9/2014 | Arrasvuori et al. |
| 8,839,327 B2 | 9/2014 | Amento et al. |
| 8,890,926 B2 | 11/2014 | Tandon et al. |
| 8,892,999 B2 | 11/2014 | Nims et al. |
| 8,924,250 B2 | 12/2014 | Bates et al. |
| 8,963,926 B2 | 2/2015 | Brown et al. |
| 8,989,786 B2 | 3/2015 | Feghali |
| 9,086,776 B2 | 7/2015 | Ye et al. |
| 9,105,014 B2 | 8/2015 | Collet et al. |
| 9,241,184 B2 | 1/2016 | Weerasinghe |
| 9,256,860 B2 | 2/2016 | Herger et al. |
| 9,298,257 B2 | 3/2016 | Hwang et al. |
| 9,314,692 B2 | 4/2016 | Konoplev et al. |
| 9,330,483 B2 | 5/2016 | Du et al. |
| 9,357,174 B2 | 5/2016 | Li et al. |
| 9,361,510 B2 | 6/2016 | Yao et al. |
| 9,378,576 B2 | 6/2016 | Bouaziz et al. |
| 9,402,057 B2 | 7/2016 | Kaytaz et al. |
| 9,412,192 B2 | 8/2016 | Mandel et al. |
| 9,460,541 B2 | 10/2016 | Li et al. |
| 9,489,760 B2 | 11/2016 | Li et al. |
| 9,503,845 B2 | 11/2016 | Vincent |
| 9,508,197 B2 | 11/2016 | Quinn et al. |
| 9,544,257 B2 | 1/2017 | Ogundokun et al. |
| 9,576,400 B2 | 2/2017 | Van Os et al. |
| 9,589,357 B2 | 3/2017 | Li et al. |
| 9,592,449 B2 | 3/2017 | Barbalet et al. |
| 9,648,376 B2 | 5/2017 | Chang et al. |
| 9,697,635 B2 | 7/2017 | Quinn et al. |
| 9,706,040 B2 | 7/2017 | Kadirvel et al. |
| 9,744,466 B2 | 8/2017 | Fujioka |
| 9,746,990 B2 | 8/2017 | Anderson et al. |
| 9,749,270 B2 | 8/2017 | Collet et al. |
| 9,792,714 B2 | 10/2017 | Li et al. |
| 9,839,844 B2 | 12/2017 | Dunstan et al. |
| 9,883,838 B2 | 2/2018 | Kaleal, III et al. |
| 9,898,849 B2 | 2/2018 | Du et al. |
| 9,911,073 B1 | 3/2018 | Spiegel et al. |
| 9,936,165 B2 | 4/2018 | Li et al. |
| 9,959,037 B2 | 5/2018 | Chaudhri et al. |
| 9,980,100 B1 | 5/2018 | Charlton et al. |
| 9,990,373 B2 | 6/2018 | Fortkort |
| 10,039,988 B2 | 8/2018 | Lobb et al. |
| 10,062,367 B1 * | 8/2018 | Evans ............... G11B 27/34 |
| 10,097,492 B2 | 10/2018 | Tsuda et al. |
| 10,116,598 B2 | 10/2018 | Tucker et al. |
| 10,155,168 B2 | 12/2018 | Blackstock et al. |
| 10,242,477 B1 | 3/2019 | Charlton et al. |
| 10,242,503 B2 | 3/2019 | McPhee et al. |
| 10,262,250 B1 | 4/2019 | Spiegel et al. |
| 10,362,219 B2 | 7/2019 | Wilson et al. |
| 10,475,225 B2 | 11/2019 | Park et al. |
| 10,504,266 B2 | 12/2019 | Blattner et al. |
| 10,573,048 B2 | 2/2020 | Ni et al. |
| 10,657,701 B2 | 5/2020 | Osman et al. |
| 2002/0067362 A1 | 6/2002 | Agostino Nocera et al. |
| 2002/0169644 A1 | 11/2002 | Greene |
| 2003/0028380 A1 | 2/2003 | Freeland et al. |
| 2005/0162419 A1 | 7/2005 | Kim et al. |
| 2005/0206610 A1 | 9/2005 | Cordelli |
| 2006/0294465 A1 | 12/2006 | Ronen et al. |
| 2007/0113181 A1 | 5/2007 | Blattner et al. |
| 2007/0168863 A1 | 7/2007 | Blattner et al. |
| 2007/0174396 A1 | 7/2007 | Kumar et al. |
| 2007/0176921 A1 | 8/2007 | Iwasaki et al. |
| 2008/0158222 A1 | 7/2008 | Li et al. |
| 2009/0016617 A1 | 1/2009 | Bregman-amitai et al. |
| 2009/0055484 A1 | 2/2009 | Vuong et al. |
| 2009/0070688 A1 | 3/2009 | Gyorfi et al. |
| 2009/0099925 A1 | 4/2009 | Mehta et al. |
| 2009/0106672 A1 | 4/2009 | Burstrom |
| 2009/0158170 A1 | 6/2009 | Narayanan et al. |
| 2009/0177976 A1 | 7/2009 | Bokor et al. |
| 2009/0202114 A1 | 8/2009 | Morin et al. |
| 2009/0265604 A1 | 10/2009 | Howard et al. |
| 2009/0300525 A1 | 12/2009 | Jolliff et al. |
| 2009/0303984 A1 | 12/2009 | Clark et al. |
| 2010/0011422 A1 | 1/2010 | Mason et al. |
| 2010/0023885 A1 | 1/2010 | Reville et al. |
| 2010/0115426 A1 | 5/2010 | Liu et al. |
| 2010/0162149 A1 | 6/2010 | Sheleheda et al. |
| 2010/0203968 A1 | 8/2010 | Gill et al. |
| 2010/0227682 A1 | 9/2010 | Reville et al. |
| 2011/0093780 A1 | 4/2011 | Dunn |
| 2011/0115798 A1 | 5/2011 | Nayar et al. |
| 2011/0148864 A1 | 6/2011 | Lee et al. |
| 2011/0239136 A1 | 9/2011 | Goldman et al. |
| 2012/0113106 A1 | 5/2012 | Choi et al. |
| 2012/0124458 A1 | 5/2012 | Cruzada |
| 2012/0130717 A1 | 5/2012 | Xu et al. |
| 2012/0162350 A1 * | 6/2012 | Lee ............... H04M 1/7243 |
| | | 348/14.03 |
| 2013/0103760 A1 | 4/2013 | Golding et al. |
| 2013/0201187 A1 | 8/2013 | Tong et al. |
| 2013/0249948 A1 | 9/2013 | Reitan |
| 2013/0257877 A1 | 10/2013 | Davis |
| 2014/0043329 A1 | 2/2014 | Wang et al. |
| 2014/0055554 A1 | 2/2014 | Du et al. |
| 2014/0125678 A1 | 5/2014 | Wang et al. |
| 2014/0129343 A1 | 5/2014 | Finster et al. |
| 2015/0206349 A1 | 7/2015 | Rosenthal et al. |
| 2016/0134840 A1 | 5/2016 | Mcculloch |

(56) References Cited

U.S. PATENT DOCUMENTS

| | | | |
|---|---|---|---|
| 2016/0203827 A1* | 7/2016 | Leff | G10L 19/125 |
| | | | 704/207 |
| 2016/0234149 A1 | 8/2016 | Tsuda et al. | |
| 2017/0080346 A1 | 3/2017 | Abbas | |
| 2017/0087473 A1 | 3/2017 | Siegel et al. | |
| 2017/0113140 A1 | 4/2017 | Blackstock et al. | |
| 2017/0118145 A1 | 4/2017 | Aittoniemi et al. | |
| 2017/0199855 A1 | 7/2017 | Fishbeck | |
| 2017/0235848 A1 | 8/2017 | Van Deusen et al. | |
| 2017/0310934 A1 | 10/2017 | Du et al. | |
| 2017/0312634 A1 | 11/2017 | Ledoux et al. | |
| 2017/0357417 A1* | 12/2017 | Goossens | G06F 3/04883 |
| 2018/0047200 A1 | 2/2018 | O'hara et al. | |
| 2018/0113587 A1 | 4/2018 | Allen et al. | |
| 2018/0115503 A1 | 4/2018 | Baldwin et al. | |
| 2018/0315076 A1 | 11/2018 | Andreou | |
| 2018/0315133 A1 | 11/2018 | Brody et al. | |
| 2018/0315134 A1 | 11/2018 | Amitay et al. | |
| 2018/0336713 A1* | 11/2018 | Avendano | G06T 13/40 |
| 2018/0336716 A1* | 11/2018 | Ramprashad | H04L 51/10 |
| 2019/0001223 A1 | 1/2019 | Blackstock et al. | |
| 2019/0057616 A1 | 2/2019 | Cohen et al. | |
| 2019/0188920 A1 | 6/2019 | Mcphee et al. | |

FOREIGN PATENT DOCUMENTS

| | | |
|---|---|---|
| EP | 2184092 | 5/2010 |
| EP | 3174052 | 5/2017 |
| JP | 2001230801 | 8/2001 |
| JP | 5497931 | 3/2014 |
| KR | 101445263 | 9/2014 |
| WO | 2003094072 | 11/2003 |
| WO | 2004095308 | 11/2004 |
| WO | 2006107182 | 10/2006 |
| WO | 2007134402 | 11/2007 |
| WO | 2012139276 | 10/2012 |
| WO | 2013027893 | 2/2013 |
| WO | 2013152454 | 10/2013 |
| WO | 2013166588 | 11/2013 |
| WO | 2014031899 | 2/2014 |
| WO | 2014194439 | 12/2014 |
| WO | 2015192748 | 12/2015 |
| WO | 2016090605 | 6/2016 |
| WO | 2018081013 | 5/2018 |
| WO | 2018102562 | 6/2018 |
| WO | 2018129531 | 7/2018 |
| WO | 2019089613 | 5/2019 |
| WO | 2023076287 | 5/2023 |

OTHER PUBLICATIONS

Screen captures from YouTube video clip entitled "How to Trim/Cut/Split Videos on iPhone X, XR, XS, XS Max (Super Easy)" 3 pages, uploaded Dec. 22, 2019 by user "WorldofTech." Retrieved from the internet: https://www.youtube.com/watch?v=713Bb0P5QXQ (Year: 2019).*

"International Application Serial No. PCT US2022 047747, International Search Report dated Feb. 15, 2023", 4 pgs.

"International Application Serial No. PCT US2022 047747, Written Opinion dated Feb. 15, 2023", 4 pgs.

* cited by examiner

VOICE NOTES WITH CHANGING EFFECTS

TECHNICAL FIELD

The present disclosure relates generally to providing an avatar-based communication session using a messaging application.

BACKGROUND

As the popularity of social networking grows, social networks are expanding their capabilities. To improve ease of use, social networks are integrating more and more functions such that a user may accomplish many or even most of their computer-based tasks within the social network itself.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
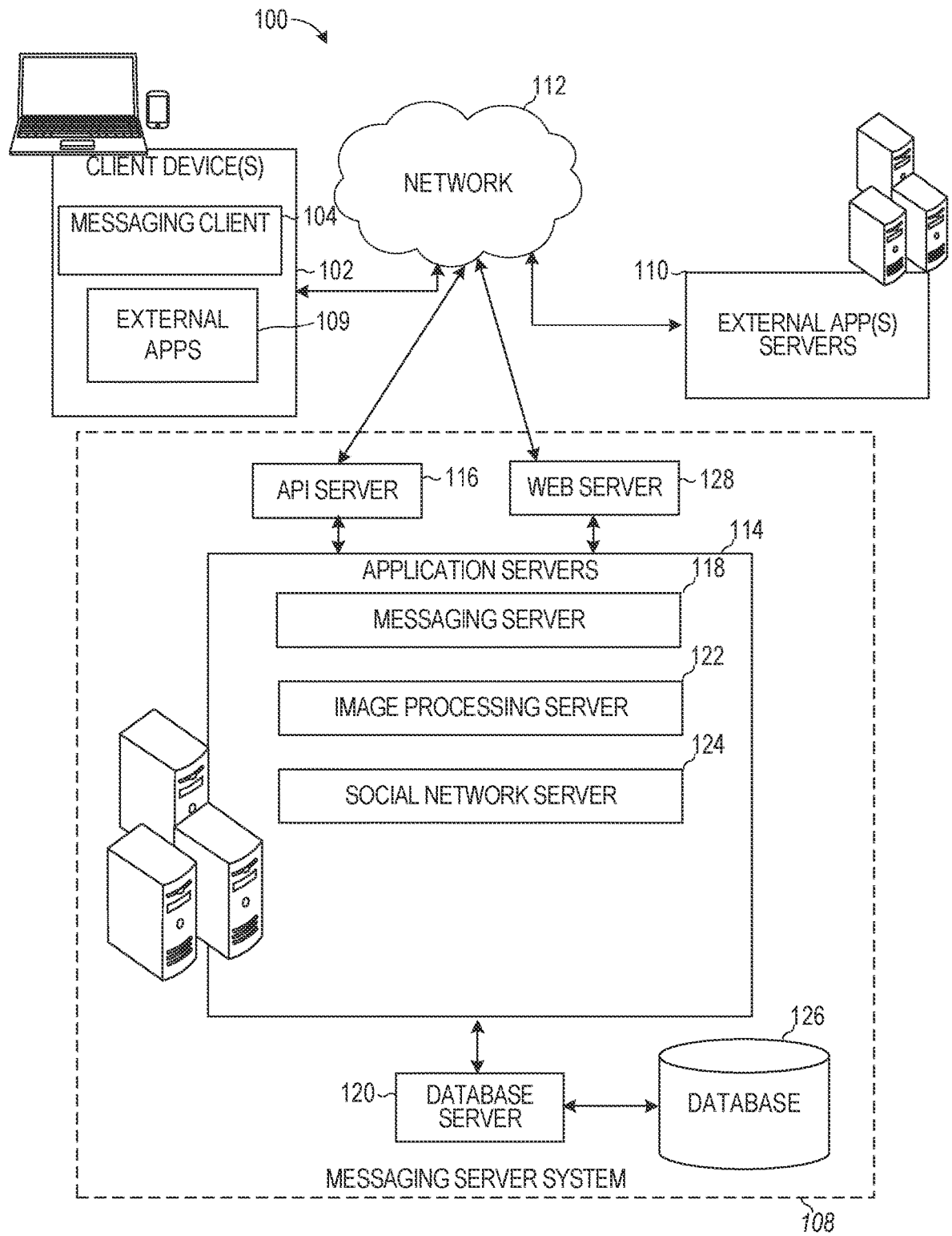
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Typically, messaging systems allow users to exchange text and pre-recorded voice messages with each other. To send a voice message, a given user selects an option to record a message and that message is then delivered to the other users. The recipients are notified about the message and can playback the recorded message to hear the voice message. While such systems generally work well, simply hearing a voice message sent by a given user without seeing the user speaking the message can cause the recipients to misinterpret the message. This is because non-verbal communication, such as body language, facial expressions and gestures, can be more informative and convey more meaning beyond what is being said by the given user.

Certain systems allow users to supplement their messages with various emojis or graphical representations of expressions. These systems improve the understanding of the messages that are exchanged but involve many additional steps and pages to be navigated through to generate the messages with the emojis. Namely, users have to page through multitude pages of information to find a desired graphical representation that best conveys their message. The lack of automation and complexities involved in finding a desired graphical representation of expression is burdensome on the users, which leads to lack of use and waste of resources. Also, even when a graphical representation of expression is sent with a message, there can still be missing non-verbal cues that can lead to misunderstanding or misinterpretation of the messages.

Some other systems allow users to change the voice characteristics of a given message that is delivered to a recipient. Namely, such systems record a user's voice and then perform various complex post processing operations to change the recorded voice into another type of voice, such as one spoken by a character or actor. These systems generally work well, however processing the voice after the voice is recorded consumes a great deal of resources and makes such systems inefficient and incapable of being deployed and implemented on mobile devices. Some of these systems even need specialized hardware which is expensive and inaccessible to a wide range of users.

The disclosed techniques improve the efficiency of using the electronic device by recording voice messages in a communication session with voice modification effects applied in real-time. As a result, there is no need to perform post-processing operations to convert voice characteristics of already recorded speech which reduces system complexities and the amount of resources needed to operate a device. Namely, the disclosed examples allow a user to select a voice modification effect. Then, while the voice message is being recorded based on speech input captured by a microphone, the voice modification effects are applied to the speech input and used to update an audio file that records the modified speech input. This results in a significantly improved message delivery system and allows various non-verbal cues to be delivered with a voice message to help recipients understand the meaning of the voice message. Also, the disclosed examples generate the voice message with the voice modification effects applied in real time while a user is recording a voice message, which significantly reduces the amount of time it takes a user to compose a voice message that incorporates a user's facial and other non-verbal expressions.

In some examples of the disclosed techniques, a messaging application or computing device via a messaging application receives a request from a first participant to send a voice message to a second participant in a communication session. In response to receiving the request the messaging application selects a voice modification effect and receives input to begin recording the voice message. While the voice message is being recorded, speech input is continuously received from a client device of the first participant and the messaging application modifies the speech input based on the voice modification effect in real time, and continuously updates an audio file with the modified speech input. In response to receiving input to terminate recording the voice message, the messaging application provides a first option to playback the audio file and a second option to send the audio file as the voice message to the second participant.

As a result, a user can compose a voice message and deliver such a voice message to one or more other participants in a conversation session without having to search through multiple pages of information to find a suitable graphical representation of expression to represent the user's intent.

This reduces the overall amount of resources required to generate voice messages in a communication session (e.g., a chat session) and increases the overall appeal of using the messaging application.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications, such as external apps 109 using Application Programming Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces of the messaging client 104.

Turning now specifically to the messaging server system 108, an API server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114 and provides web-based interfaces to the application servers 114. To this end, the web server 128 processes incoming network requests over the Hypertext Transfer Protocol (HTTP) and several other related protocols.

The API server 116 receives and transmits message data (e.g., commands and message payloads) between the client device 102 and the application servers 114. Specifically, the API server 116 provides a set of interfaces (e.g., routines and protocols) that can be called or queried by the messaging client 104 in order to invoke functionality of the application servers 114. The API server 116 exposes various functions supported by the application servers 114, including account registration; login functionality; the sending of messages, via the application servers 114, from a particular messaging client 104 to another messaging client 104; the sending of media files (e.g., images or video) from a messaging client 104 to a messaging server 118, and for possible access by another messaging client 104; the settings of a collection of media data (e.g., story); the retrieval of a list of friends of a user of a client device 102; the retrieval of such collections; the retrieval of messages and content; the addition and deletion of entities (e.g., friends) to an entity graph (e.g., a social graph); the location of friends within a social graph; and opening an application event (e.g., relating to the messaging client 104).

The application servers 114 host a number of server applications and subsystems, including, for example, a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

The application servers 114 also include an image processing server 122 that is dedicated to performing various image processing operations, typically with respect to images or video within the payload of a message sent from or received at the messaging server 118.

Figure 2:
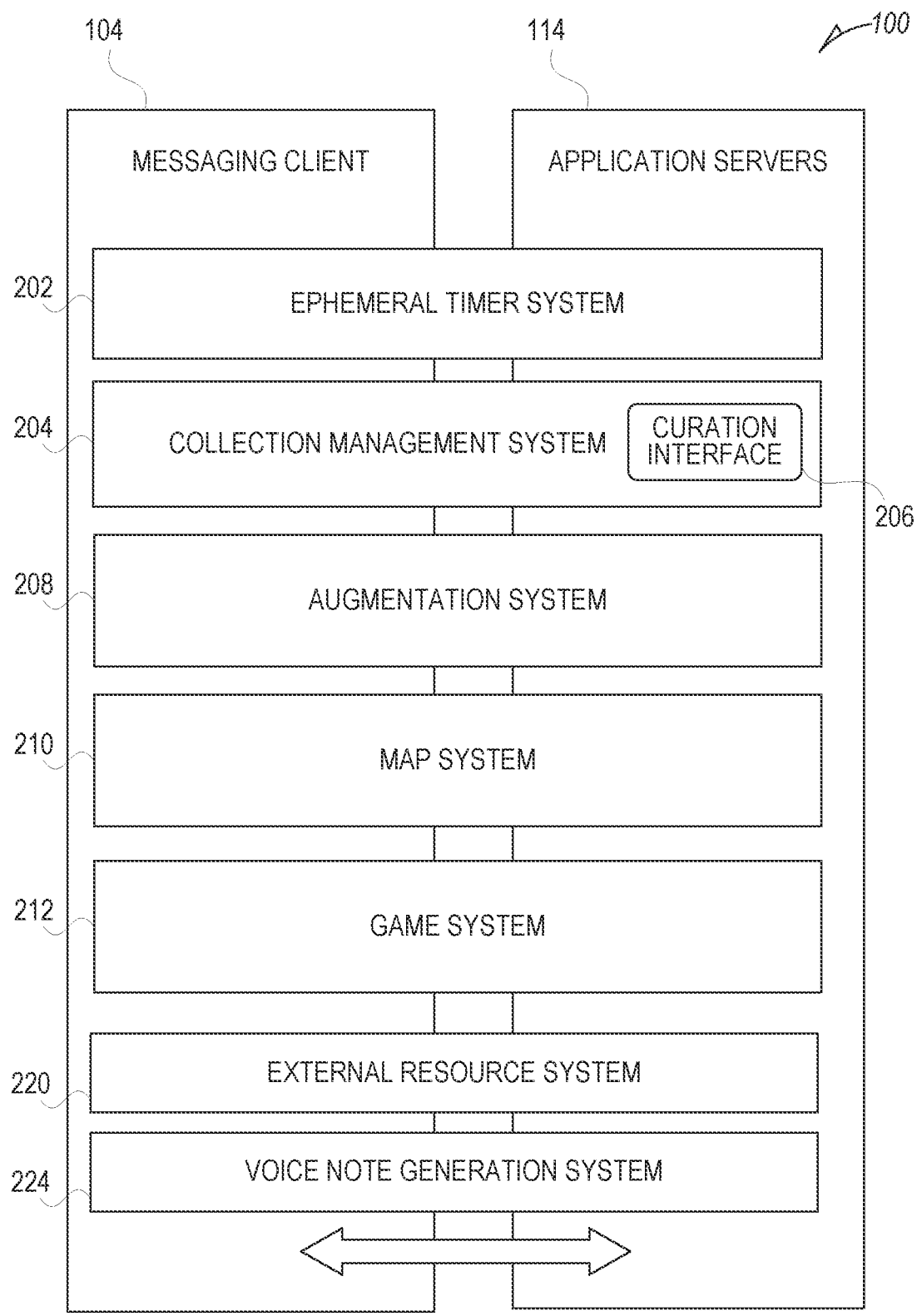
FIG. 2 is a diagrammatic representation of a messaging client application, in accordance with some examples.

Image processing server 122 is used to implement scan functionality of the augmentation system 208 (shown in FIG. 2). Scan functionality includes activating and providing one or more augmented reality (AR) experiences on a client device 102 when an image is captured by the client device 102. Specifically, the messaging client 104 on the client device 102 can be used to activate a camera. The camera displays one or more real-time images or a video to a user along with one or more icons or identifiers of one or more AR experiences. The user can select a given one of the identifiers to launch the corresponding AR experience or perform a desired image modification.

Figure 3:
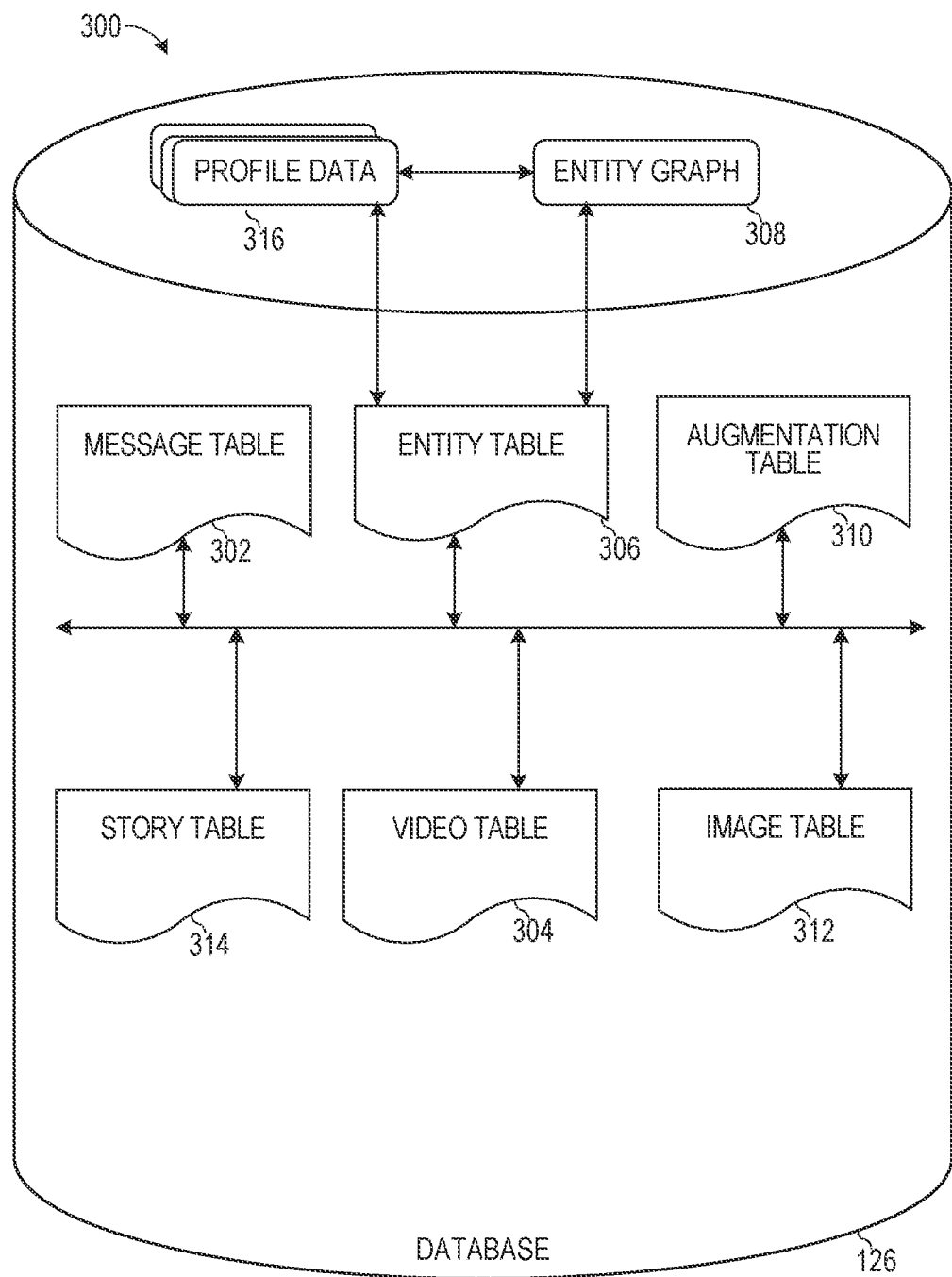
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app") or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from an external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

The messaging client 104 can present participants in a communication session with an option to generate a voice message (or alternatively referred to as a voice note). For example, messaging client 104 can detect input that selects a microphone icon that is displayed in a text entry region of a communication interface. In some cases, the messaging client 104 automatically starts recording speech input captured by the microphone in response to detecting that a touch and hold gesture of the microphone icon. In some cases, in response to detecting the touch and hold gesture of the microphone icon, the messaging client 104 presents a voice message recording interface allowing the user to select a voice modification effect and control start and ending of the voice message recording. The voice message can include an audio file with pre-recorded verbal (speech) input received from a participant via a microphone of the client device 102 and modified based on a selected voice modification effect. The voice message can have a specified duration selected by the participant recording the voice message. In some examples, the voice message can have a maximum duration set that prevents recording audio files that exceed the maximum duration.

In an example, the messaging client 104 presents a voice message recording interface that includes one or more voice modification effects. The messaging client 104 can presents a plurality of visual indicators or icons representing each of the plurality of effects simultaneously. For example, the messaging client 104 can present a first voice modification effect with a first visual indicator (e.g., an image, video, animation, or graphic) that represents the first voice modification effect. The first voice modification effect can be presented in a list together with a different second visual indicator (e.g., an image, video, animation, or graphic), of a different second voice modification effect, that represents the second voice modification effect.

The messaging client 104 can detect a touch input that includes a swipe left or right gesture to navigate through the voice modification effects that are in the list. As each voice modification effect is brought into focus by the touch input, the corresponding visual indicator of the voice modification effect is visually emphasized, such as by enlarging the visual indicator, highlighting the visual indicator or changing a color of the visual indicator relative to other visual indicators associated with other voice modification effects. The messaging client 104 can detect input that touches and holds the visual indicator of the voice modification effect that is currently in focus. In response, the messaging client 104 animates the visual indicator to represent a waveform indicating that a voice message is being recorded.

As an example, in response to the input that touches and holds the visual indicator of the voice modification effect that is currently in focus (indicating a selection of the voice modification effect), the messaging client 104 begins capturing speech input received from a microphone of the client device 102. Concurrently with capturing the speech input, the messaging client 104 applies a voice modification process in real time to change the voice or verbal characteristics of the speech input into or based on the voice characteristics associated with the selected voice modification effect. Once the messaging client 104 changes or modifies the voice or verbal characteristics of the speech input into or based on the voice characteristics associated with the selected voice modification effect, the messaging client 104 stores the modified voice or verbal characteristics in an audio file. Namely, the messaging client 104 continuously updates the audio file to include voice or verbal characteristics modified in real time based on voice characteristics associated with the selected voice modification effect.

In one example, the voice modification effect can include at least one of a voice of an animal, a voice of a robot, a voice of an alien, background removal, or autotune. Specifically, if the selected voice modification effect is a voice of an animal, such as a chipmunk, bear, parrot or owl, the messaging client 104 modifies the frequency, pitch, distortion and/or rate (voice characteristics) at which the captured speech input is received to correspond to the frequency, pitch and rate of the animal. As the speech input is captured by the microphone, the messaging client 104 adjusts the frequency, pitch and rate of the speech input in real time based on the voice characteristics of the selected voice modification effect. The messaging client 104 then stores the modified speech input in the audio file that is used to generate the voice note.

The messaging client 104 can detect touch input that releases the touch and hold gesture of the visual indicator of the voice modification effect that is currently in focus. In response, the messaging client 104 can terminate recording the voice note. Namely, the messaging client 104 automatically generates a voice note based on the audio file that was continuously updated with the modified speech input. The messaging client 104 presents a first option for the user to share the voice note with one or more other recipients in the communication session. The messaging client 104 presents a second option for the user to playback the audio file with the modified speech input (e.g., the speech input that was received and modified in real time with a selected voice modification effect). The messaging client 104 can present a delete option to delete the audio file and a duration representing the length of the voice note.

In some examples, the messaging client 104 can identify one or more visual effects associated with the selected voice modification effect. In response, the messaging client 104 associates the one or more visual effects with the voice note that is generated. Each voice modification effect can be associated with a different set of visual effects.

For example, a first visual effect that includes an alien voice can be associated with outer space related visual effects (e.g., planets, darkness and/or stars). When a voice message that includes speech input modified by a voice modification effect associated with the first visual effect is being played back, the screen and background can be modified to display the outer space related visual effects. As another example, a second visual effect that includes a forest animal voice can be associated with forest related visual effects (e.g., trees, grass, and/or rain). When a voice message that includes speech input modified by a voice modification effect associated with the second visual effect is being played back, the screen and background can be modified to display the forest related visual effects. As another example, the visual effect can include modification of an avatar representing a user who created and shared the voice message with the modified speech input. Specifically, if the voice modification effect is a voice of an animal, the avatar of the user who sent the voice message can temporarily be changed to look like the animal while the voice message is being played. When the voice message stops being played, the avatar returns to looking like the user who sent the message from looking like the animal. In another implementation, if the voice modification effect is a voice of an alien, the avatar of the user who sent the voice message can temporarily be changed to look like the alien while the voice message is being played. When the voice message stops being played, the avatar returns to looking like the user who sent the message from looking like the alien.

In an example, when the voice note that includes the audio file with the modified speech input is played back (by the user who created the voice note or one or more recipients of the voice note), the one or more visual effects are retrieved and displayed while the voice note is being played back. The one or more visual effects are removed from display when playback of the voice note completes. In some cases, the messaging client 104 presents one or more options for visual effects associated with a given voice modification effect. Namely, after or before recording of the voice message completes, the messaging client 104 can recommend a set of visual effects for the user to choose from. The messaging client 104 can detect input that selects a given one of the visual effects and can associate the selected visual effects with the voice note that is generated.

In an example, the messaging client 104 can receive input that selects the option to playback the voice message. In response, the messaging client 104 presents a progress bar and automatically start playing back the audio file that includes the modified speech input. The progress bar can include a cursor identifying a current play position and a timeline representing a duration of the voice message. The progress bar can also visually depict the selected voice modification effect that has been applied to the voice or speech input that was received in real time. As an example, the progress bar can display a visual indicator (e.g., an image, video, graphic, or animation) representing the selected voice modification effect (e.g., a picture of an animal, robot, alien, autotune, and so forth). The messaging client 104 can receive input that selects a particular region of the progress bar. In response, the messaging client 104 can present an option to apply a further voice modification effect to the voice message starting at the play position corresponding to the selected region of the progress bar. For example, the input can designate a particular time point or a segment corresponding to a duration of time between two time points.

The messaging client 104 can receive input that selects a voice modification effect (e.g., by swiping through a predetermined list of voice modification effects represented by different icons) to apply to the voice message starting from the particular time point or the segment. In response to receiving a selection of the voice modification effect, the messaging client 104 performs a post processing operation to change the voice characteristics of the modified speech input to the voice characteristics of the selected voice modification effect starting from the particular time point or the segment. Namely, the messaging client 104 can first apply a first voice modification effect to the entire received speech input in real time to record a voice message. Then, the messaging client 104 can apply a second voice modification effect to one or more portions of the already recorded voice message (rather than the entire voice message) by transforming a portion of the voice message from being modified based on the first voice modification effect to being modified based on the second voice modification effect. In this way, the voice message can include a first portion that is played back with a first voice modification effect (e.g., speech input that sounds like a first animal) and a second portion following the first portion that is played back with a second voice modification effect (e.g., speech input that sounds like a second animal or alien). The messaging client 104 can visually distinguish different regions of the progress bar to represent the multiple voice modification effects that are applied to different segments of the voice message.

In some examples, the messaging client 104 can receive input that selects a send option to share the voice message with the modified speech input with one or more participants in the communication session. In response, the messaging client 104 sends a visual identifier of the voice modification effect to the one or more participants in the communication session along with the voice message and associated visual effects. The visual identifier can be displayed in line between one or more other messages exchanged in the communication session. In response to detecting input from one of the participants in the communication session that selects the visual identifier, the messaging client 104 begins playing back the audio file that includes the modified speech input and the visual effects associated with the visual identifier.

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 further includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to obtain AR experiences and presents identifiers of such experiences in one or more user interfaces (e.g., as icons over a real-time image or video or as thumbnails or icons in interfaces dedicated for presented identifiers of AR experiences). Once an AR experience is selected, one or more images, videos, or AR graphical elements are retrieved and presented as an overlay on top of the images or video captured by the client device 102. In some cases, the camera is switched to a front-facing view (e.g., the front-facing camera of the client device 102 is activated in response to activation of a particular AR experience) and the images from the front-facing camera of the client device 102 start being displayed on the client device 102 instead of the rear-facing camera of the client device 102. The one or more images, videos, or AR graphical elements are retrieved and presented as an overlay on top of the images that are captured and displayed by the front-facing camera of the client device 102.

In other examples, the augmentation system 208 is able to communicate and exchange data with another augmentation system 208 on another client device 102 and with the server via the network 112. The data exchanged can include a session identifier that identifies the shared AR session, a transformation between a first client device 102 and a second client device 102 (e.g., a plurality of client devices 102 include the first and second devices) that is used to align the shared AR session to a common point of origin, a common coordinate frame, functions (e.g., commands to invoke functions), and other payload data (e.g., text, audio, video, or other multimedia data).

The augmentation system 208 sends the transformation to the second client device 102 so that the second client device 102 can adjust the AR coordinate system based on the transformation. In this way, the first and second client devices 102 synch up their coordinate systems and frames for displaying content in the AR session. Specifically, the augmentation system 208 computes the point of origin of the second client device 102 in the coordinate system of the first client device 102. The augmentation system 208 can then determine an offset in the coordinate system of the second client device 102 based on the position of the point of origin from the perspective of the second client device 102 in the coordinate system of the second client device 102. This offset is used to generate the transformation so that the second client device 102 generates AR content according to a common coordinate system or frame as the first client device 102.

The augmentation system 208 can communicate with the client device 102 to establish individual or shared AR sessions. The augmentation system 208 can also be coupled to the messaging server 118 to establish an electronic group communication session (e.g., group chat, instant messaging) for the client devices 102 in a shared AR session. The electronic group communication session can be associated with a session identifier provided by the client devices 102 to gain access to the electronic group communication session and to the shared AR session. In one example, the client devices 102 first gain access to the electronic group communication session and then obtain the session identifier in the electronic group communication session that allows the client devices 102 to access the shared AR session. In some examples, the client devices 102 are able to access the shared AR session without aid or communication with the augmentation system 208 in the application servers 114.

The map system 210 provides various geographic location functions and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104 and played with other users of the messaging system 100. The messaging system 100 further enables a particular user to invite other users to participate in the play of a specific game by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes APIs with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server

110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets) and the messaging client 104. This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between an external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a graphical user interface of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104.

In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional (2D) avatars of users with or without different avatar characteristics). As another example, external resources that include small-scale versions of external applications (e.g., web-based versions of third-party applications) are provided with access to a second type of user data (e.g., payment information, 2D avatars of users, three-dimensional (3D) avatars of users, and avatars with various avatar characteristics). Avatar characteristics include different ways to customize a look and feel of an avatar, such as different poses, facial features, clothing, and so forth.

A voice note generation system 224 provides a communication interface for generating voice notes that include modified speech input in real time. Namely, the voice note generation system 224 receives input that selects a voice modified effect. Then, voice note generation system 224 detects input that instructs the voice note generation system 224 to begin recording and storing speech input captured by a microphone. The voice note generation system 224 applies the selected voice modification effect to the captured speech input and then in real time or continuously stores the modified speech input in an audio file by updating contents of the audio file with the modified speech input. The voice note generation system 224 can detect input to playback or review the voice note that includes the audio file and can receive input to apply different voice modification effects to different portions of the voice message. The voice note generation system 224 can associated one or more visual effects with the voice note and share the voice note with one or more participants in a communication session. An illustrative implementation of the voice note generation system 224 is shown and described in connection with FIG. 5 below.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, are described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization), interested-based, or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, and settings (e.g., notification and privacy settings), as well as a user-selected avatar representation (or collection of such avatar representations). A particular user may then selectively include one or more of these avatar representations within the content of messages communicated via the messaging system 100 and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

The database 126 can also store data pertaining to individual and shared AR sessions. This data can include data communicated between an AR session client controller of a first client device 102 and another AR session client controller of a second client device 102, and data communicated between the AR session client controller and the augmentation system 208. Data can include data used to establish the common coordinate frame of the shared AR scene, the transformation between the devices, the session identifier, images depicting a body, skeletal joint positions, wrist joint positions, feet, and so forth.

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes AR content items (e.g., corresponding to applying AR experiences). An AR content item or AR item may be a real-time special effect and sound that may be added to an image or a video.

As described above, augmentation data includes AR content items, overlays, image transformations, AR images, AR logos or emblems, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple AR content items, a user can use a single video clip with multiple AR content items to see how the different AR content items will modify the stored clip. For example, multiple AR content items that apply different pseudorandom movement models can be applied to the same content by selecting different AR content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different AR content items will look within different windows in a display at the same time. This can, for example, enable multiple windows with different pseudorandom animations to be viewed on a display at the same time.

Data and various systems using AR content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a 3D mesh model of the object or objects and using transformations and animated textures of the model within the video to achieve the transformation. In other examples, tracking of points on an object may be used to place an image or texture (which may be 2D or 3D) at the tracked position. In still further examples, neural network analysis of video frames may be used to place images, models, or textures in content (e.g., images or frames of video). AR content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of an object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh and then various areas based on the points are generated. The elements of the object are then tracked by aligning the area for each element with a position for each of the at least one elements, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an ASM algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search is started for landmarks from the mean shape aligned to the position and size of the face determined by a global face detector. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
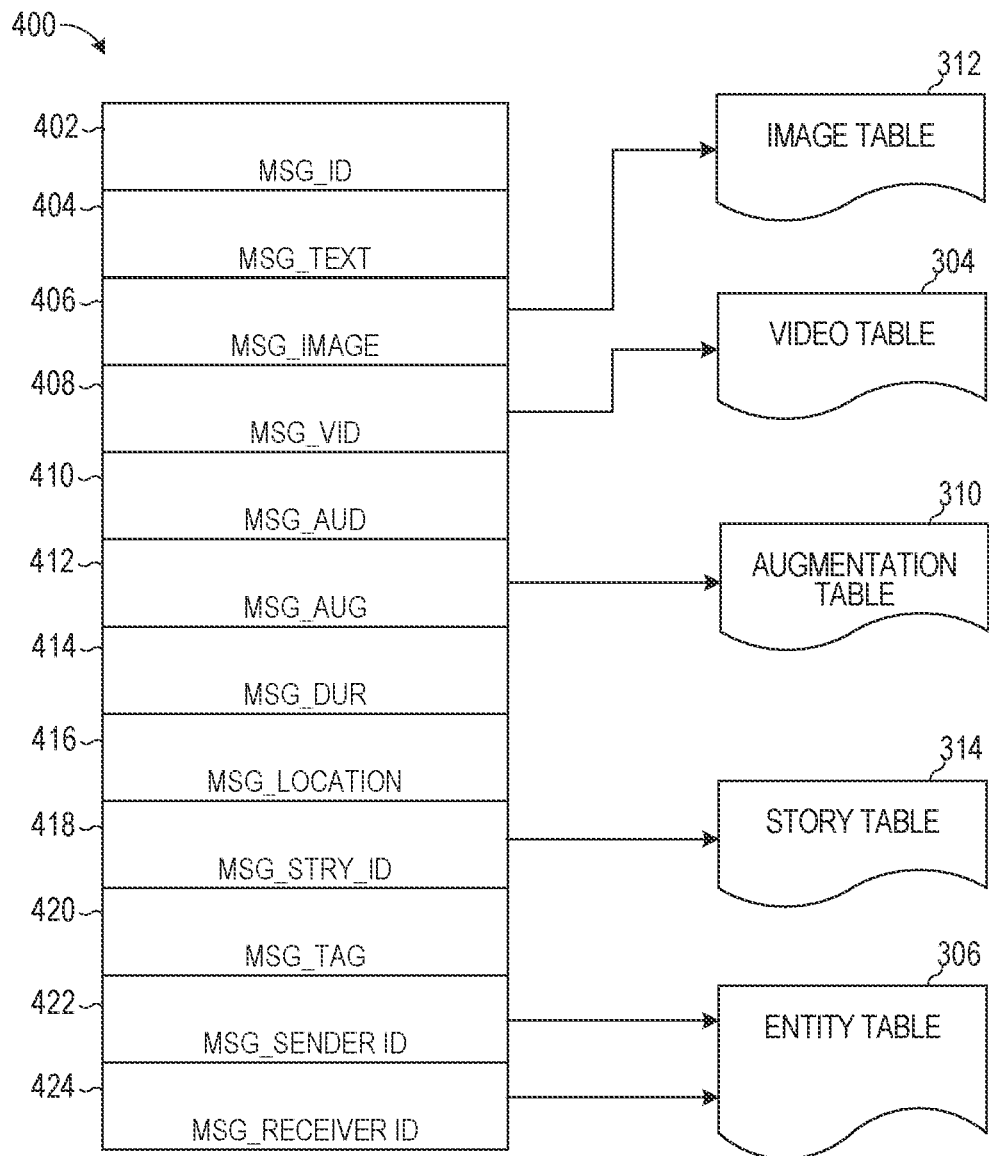
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 312.

message video payload 408: video data, captured by a camera component or retrieved from a memory component of the client device 102, and that is included in the message 400. Video data for a sent or received message 400 may be stored in the video table 304.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).

message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422; an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Voice Note Generation System

Figure 5:
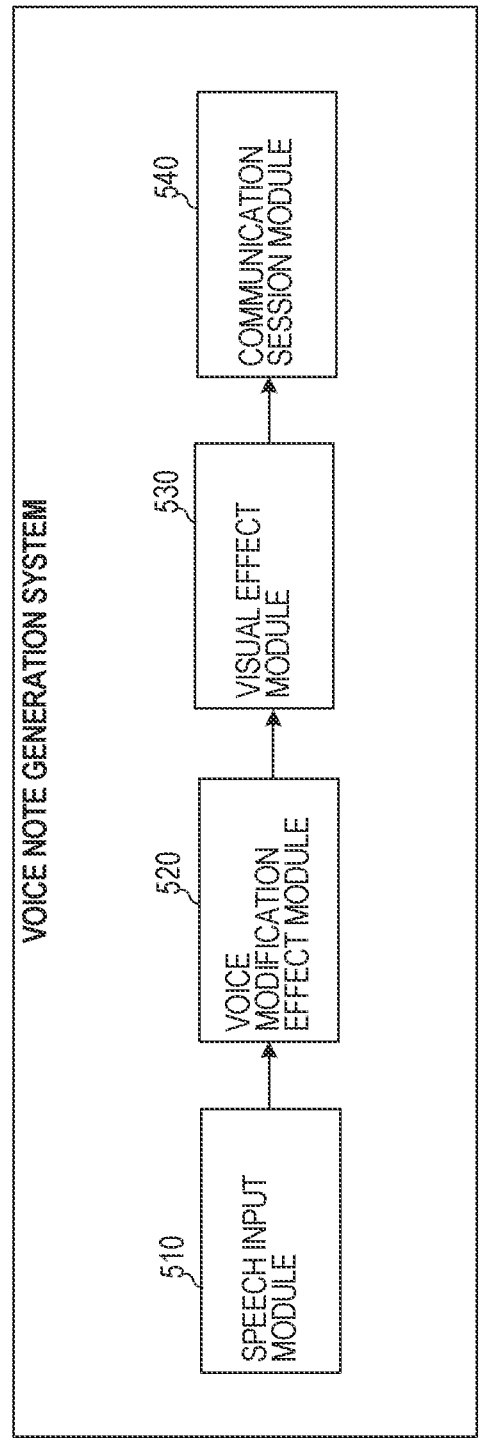
FIG. 5 is a block diagram showing an example voice note generation system, according to some examples.

FIG. 5 is a block diagram showing an example voice note generation system 224, according to some examples. Voice note generation system 224 includes a set of components that operate on a set of input data. The voice note generation system 224 includes a speech input module 510, a voice modification effect module 520, a visual effect module 530, and a communication session module 540.

The speech input module 510 communicates with a microphone of a client device 102 to receive, capture, and store verbal or speech input from a given participant in a communication session, such as a chat session. As an example, the communication session module 540 establishes a conversation session between a plurality of participants. The conversation session allows the participants to exchange one or more voice and text messages with each other. When a given message is received from a given participant, the communication session module 540 scrolls previous messages up the screen and presents the newly received message at the bottom of the communication interface. The communication session module 540 also presents an identifier of the user who transmitted the message.

Figure 6:
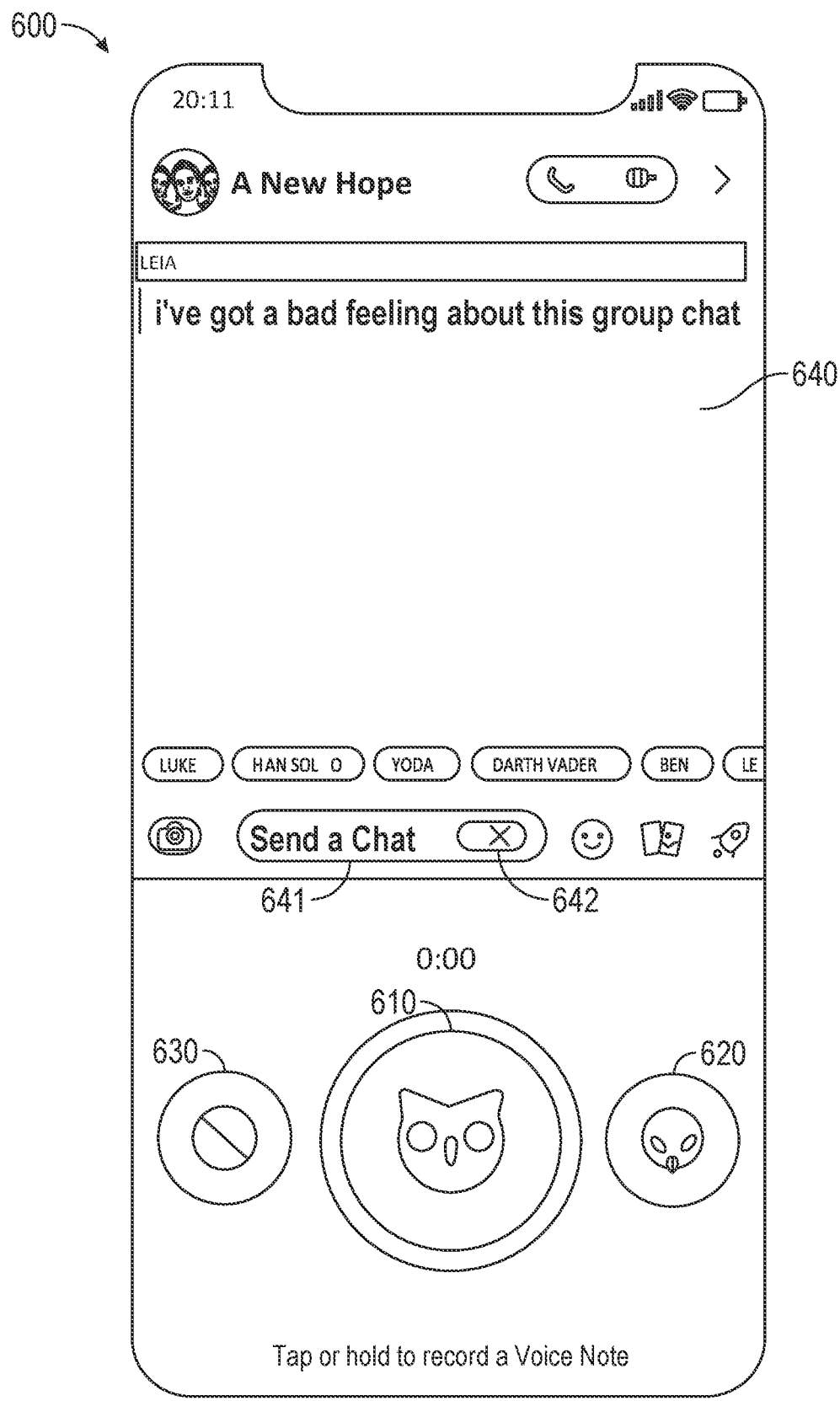
FIGS. 6, 7, and 8 are diagrammatic representations of outputs of the voice note generation system, in accordance with some examples.

An illustrative communication session interface 600 is shown in FIG. 6. The communication session interface 600 includes a plurality of messages 640 exchanged between users and a region identifying all the participants in the conversation. The communication session module 540 presents a text entry region 641. A given participant can tap or select the text entry region 641 to compose a textual message. After selecting an option to send the textual message, the communication session module 540 adds the textual message at the bottom of the other messages 640 previously exchanged in the communication session. The communication session module 540 also presents a voice note indicator 642 within or adjacent to the text entry region 641. The voice note indicator 642 can include a microphone or other indicator representing voice note generation.

The communication session module 540 can detect that the given participant taps, selects, or presses and holds a finger on the voice note indicator 642. In response, the communication session module 540 instructs the speech input module 510 to begin capturing speech input and recording such speech input in an audio file. The communication session module 540 instructs the speech input module 510 to stop capturing the speech input in response to detecting that the voice note indicator 642 or a region proximate to the voice note indicator 642 is no longer selected. In another example, the communication session module 540 can instruct the speech input module 510 to stop capturing the speech input in response to receiving an instruction or selection of an option to stop recording the voice message.

In an example, as shown in FIG. 6, the communication session module 540 presents a list of different voice modification effects in response to detecting input associated with the voice note indicator 642. For example, in response to detecting a touch and hold gesture associated with the voice note indicator 642, the communication session module 540 instructs the voice modification effect module 520 to display a vertical or horizontal list of different indicators associated with different respective voice modification effects. The list of different voice modification effects can be animated into the display by overlaying shrinking a portion of the conversation interface that includes a plurality of previously exchanged messages. Namely, the list of different voice modification effects can be animated as coming from the bottom of the screen into the display.

The voice modification effect module 520 can present a voice message (note) recording interface that includes one or more voice modification effects. The voice modification effect module 520 can presents a plurality of visual indicators or icons 610, 620, and 630 representing each of the plurality of voice modification effects simultaneously. For example, the voice modification effect module 520 can present a first voice modification effect with a first visual indicator 610 (e.g., an image, video, animation, or graphic) that represents the first voice modification effect. The first voice modification effect can be presented in a list together with a different second visual indicator 620 (e.g., an image, video, animation, or graphic), of a different second voice modification effect, that represents the second voice modification effect. The first voice modification effect can be presented in a list together with a different third visual indicator 630 (e.g., an image, video, animation, or graphic). The third visual indicator 630 can represent default voice modification effects in which no voice modification effects are applied to the recorded speech input.

The voice modification effect module 520 can detect a touch input that includes a swipe left or right gesture to navigate through the voice modification effects that are in the list. As each voice modification effect is brought into focus by the touch input, the corresponding visual indicator of the voice modification effect is visually emphasized, such as by enlarging the visual indicator, highlighting the visual indicator or changing a color of the visual indicator relative to other visual indicators associated with other voice modification effects. As an example, the first visual indicator 610 is currently in focus in the screen 600. The voice modification effect module 520 can detect input that touches and holds the visual indicator 610 of the voice modification effect that is currently in focus. In response, the voice modification effect module 520 can begin generating and updating an audio file that includes a recording of speech input captured by the microphone and received from the speech input module 510. Namely, the input that touches and holds the visual indicator 610 instructs the voice modification effect module 520 to begin recording the voice note. In response, the voice modification effect module 520 animates the visual indicator 610 to represent a waveform indicating that a voice message is being recorded.

Figure 7:
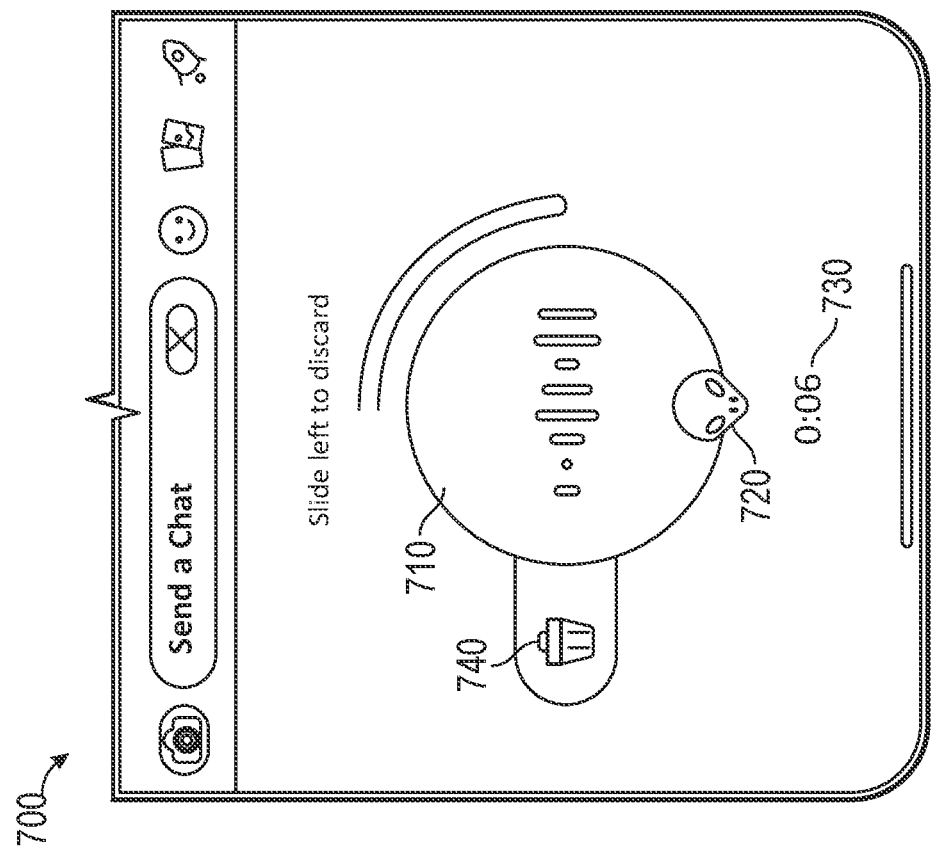
Figure 7:
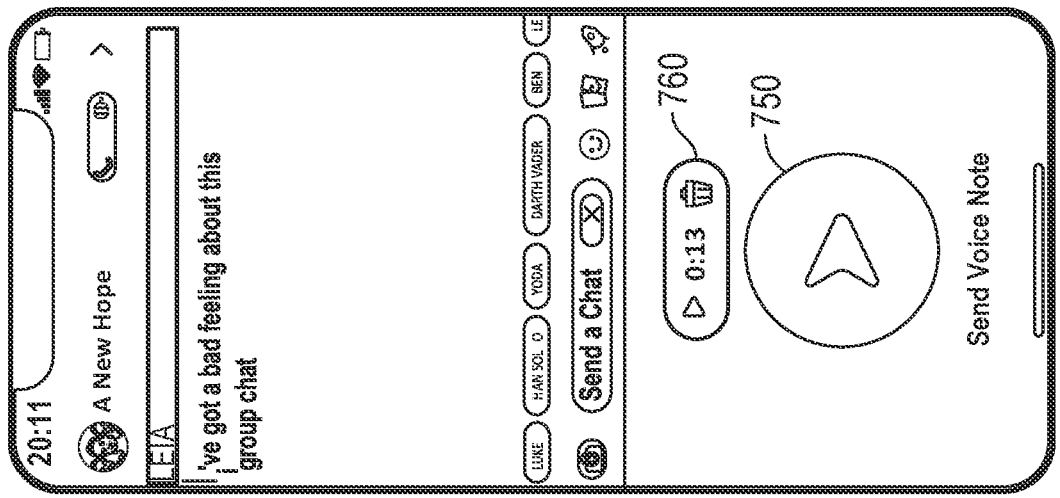

For example, as shown in FIG. 7 the voice modification effect module 520 presents a screen 700 that includes an icon 710 indicating that recording of a voice note is currently in progress. The voice modification effect module 520 displays a waveform in the icon 710 that is animated to represent visual characteristics (frequency and amplitude) of the raw speech input received from the microphone. The voice modification effect module 520 also displays a visual indicator 620 that represents a voice modification effect that is currently being applied to the received speech input. A timer 730 represents the current duration of the voice note and is incremented as the recording of the voice note progresses. The voice note continues to be recorded while the touch input continues to press on the icon 710. In response to detecting input that slides the finger towards a given direction (e.g., the left) and overlaps a delete icon 740, the voice modification effect module 520 stops recording the voice note and immediately discards or deletes the audio file.

While the speech input is being received, the voice modification effect module 520 continuously and in real time applies a voice modification effect to the speech input. For example, the voice modification effect module 520 changes one or more characteristics of the speech input (e.g., frequency, amplitude, pitch, resonance, and so forth) based on voice characteristics of the selected voice modification effect. After modifying the speech input while the speech input continues to be recorded, the voice modification effect module 520 updates an audio file to include the modified speech input. In this way, as soon as a request to terminate the recording is received (e.g., by detecting that the finger has been lifted and is no longer touching the icon 710), the voice modification effect module 520 provides a voice note that includes the audio file with the modified speech input. Namely, in response to detecting that the finger has been lifted and is no longer touching the icon 710, the voice modification effect module 520 replaces the icon 710 with a send icon 750 and a play icon 760, as shown in FIG. 7.

In some examples, the voice modification effect module 520 can communicate with the visual effect module 530 to identify one or more visual effects associated with the selected voice modification effect. In response, the visual effect module 530 searches for one or more visual effects based on the type of voice modification effect that has been selected. For example, the visual effect module 530 can maintain a database of different groups of visual effects that are associated with different voice modifications. The visual effect module 530 can select a given set of visual effects from a plurality of visual effects included in the group associated with the selected voice modification effect. In one example, the visual effect module 530 selects the given set of visual effects randomly. In some cases, the visual effect module 530 presents a list of different visual effects included in the group to the participant and receives a selection of a visual effect from the participant. In some cases, the visual effect module 530 enables the participant to provide a custom set of visual effects, such as by uploading an image, video, or graphics file or augmented reality experience.

In an example, each voice modification effect can be associated with a different set of visual effects. For example, a first visual effect associated with a first voice modification effect that includes an alien voice can be associated with outer space related visual effects (e.g., planets, darkness and/or stars). In this case, the voice note generated to include the modified speech input based on the first voice modification effect can be associated with the out space related visual effects. As a result, when a voice note that includes speech input modified by the first voice modification effect is played back, the screen and background can be modified to display the outer space related visual effects. As another example, a second visual effect associated with a second voice modification effect that includes a forest animal voice can be associated with forest related visual effects (e.g., trees, grass, and/or rain). In this case, the voice note generated to include the modified speech input based on the second voice modification effect can be associated with the forest related visual effects. When a voice message that includes speech input modified by the second visual effect is being played back, the screen and background can be modified to display the forest related visual effects.

As another example, the visual effect can include modification of an avatar representing a user who created and shared the voice message with the modified speech input. Specifically, if the voice modification effect is a voice of an animal, the avatar of the user who sent the voice message can temporarily be changed to look like the animal while the voice message is being played. When the voice message stops being played, the avatar returns to looking like the user who sent the message from looking like the animal. In another implementation, if the voice modification effect is a voice of an alien, the avatar of the user who sent the voice message can temporarily be changed to look like the alien while the voice message is being played. When the voice message stops being played, the avatar returns to looking like the user who sent the message from looking like the alien. The visual effect module 530 associates the selected one or more visual effects with the voice note that is generated after the audio file including the modified speech input is stored in the voice note.

Figure 8:
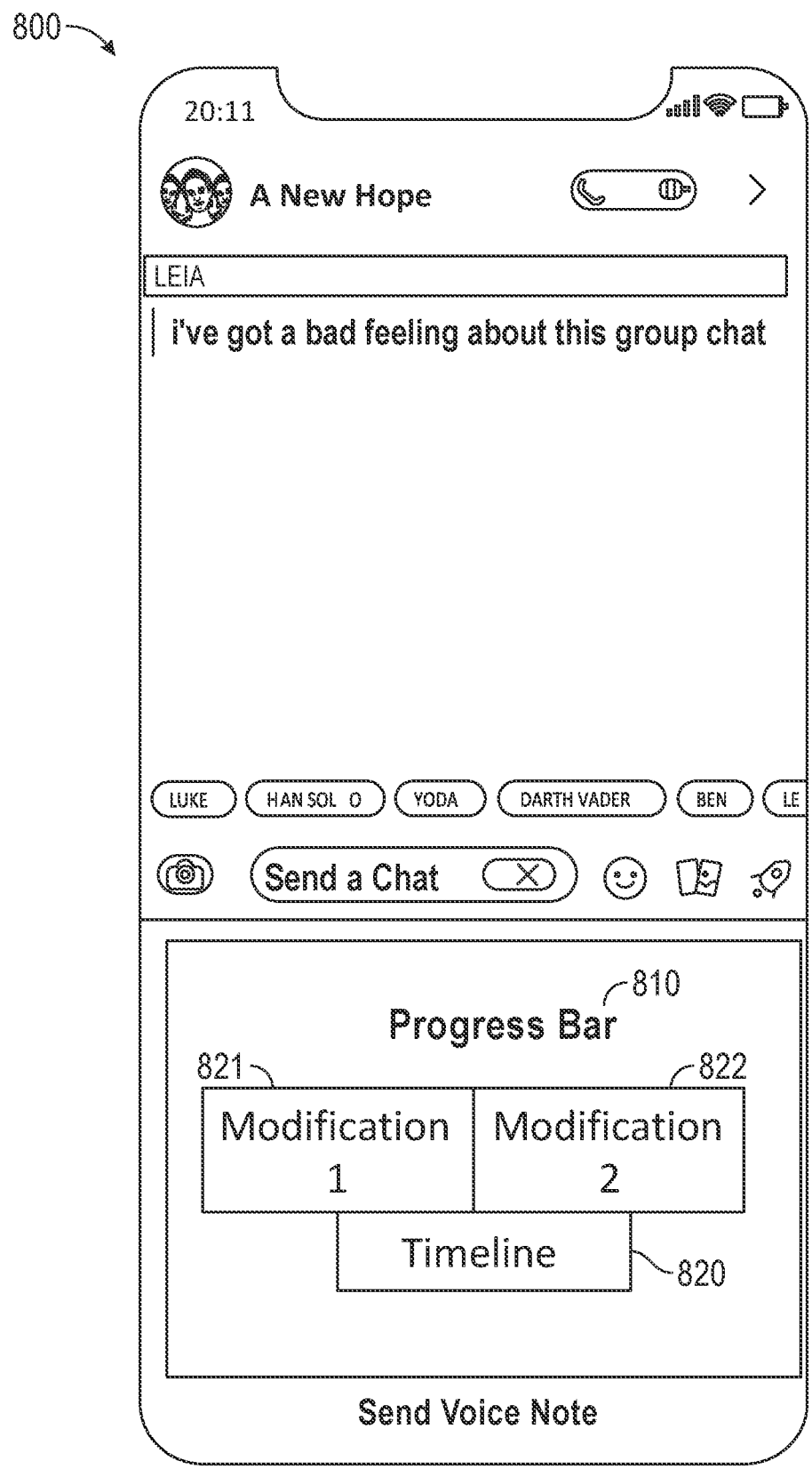

The voice modification effect module 520 can detect input that selects the play icon 760 to review and playback the contents of the voice note that includes audio file that include the modified speech input. In response, as shown in FIG. 8, the voice modification effect module 520 presents a screen 800 that includes a progress bar 810. The voice modification effect module 520 automatically starts playing back the audio file that includes the modified speech input while displaying the progress bar 810. The progress bar 810 can include a cursor identifying a current play position and a timeline 820 representing a duration of the voice note.

The progress bar 810 can also visually depict the selected voice modification effect that has been applied to the voice or speech input that was received in real time. As an example, initially the progress bar 810 can display a visual indicator 821 (e.g., an image, video, graphic, or animation) representing the selected voice modification effect (e.g., a picture of an animal, robot, alien, autotune, and so forth) across the entire length of the progress bar 810 (e.g., from a 0 second time point to a 1 minute time point). The voice modification effect module 520 can receive a request to change a voice modification effect for a portion of the voice note that is shorter than the entire voice note.

Namely, the voice modification effect module 520 can receive input that selects a particular region of the progress bar (e.g., a region corresponding to the play points between 25 seconds to 35 seconds). In response, the voice modification effect module 520 can present an option to apply a different voice modification effect to the voice note starting at the play position corresponding to the selected region of the progress bar. Specifically, the voice modification effect module 520 can apply the different voice modification effect to the portion of the voice note between the 25 seconds and 35 seconds play points and not any other play points. This results in a voice note that has a first voice modification applied from play point 0 seconds to play point 25 seconds; then a second voice modification effect from play point 25 seconds to play point 35 seconds; and then the first voice modification applied again from play point 35 seconds to play point 60 seconds. The input can designate a particular starting time point or a segment corresponding to a duration of time between two time points. If the input designates a starting time point, then the different voice modification is applied starting at the particular starting point until the end of the voice note.

After the designated region for the different voice modification effect to be applied is selected (by time point or by region), the voice modification effect module 520 can receive input that selects a voice modification effect (e.g., by swiping through a predetermined list of voice modification effects represented by different icons) to apply to the voice message starting from the particular time point or the segment. In response to receiving a selection of the voice modification effect, the voice modification effect module 520 performs a post processing operation to change the voice characteristics of the modified speech input to the voice characteristics of the selected voice modification effect starting from the particular time point or the segment. Namely, the voice modification effect module 520 can first apply a first voice modification effect to the entire received speech input in real time to record a voice message. Then, the voice modification effect module 520 can apply a second voice modification effect to one or more portions of the already recorded voice message (rather than the entire voice message) by transforming a portion of the voice message from being modified based on the first voice modification effect to being modified based on the second voice modification effect. In this way, the voice message can include a first portion that is played back with a first voice modification effect (e.g., speech input that sounds like a first animal) and a second portion following the first portion that is played back with a second voice modification effect (e.g., speech input that sounds like a second animal or alien).

In some examples, the second voice modification effect can be associated with a different set of visual effects than the first voice modification effect. In such cases, a voice note can be generated to be associated with a first set of visual effects for a portion that has been modified based on a first voice modification effect. The voice note can also be generated to be associated with a second set of visual effects for another portion that has been modified based on a second voice modification effect. When the voice note is played back, the first set of visual effects are presented while the portion modified based on the first voice modification effect is presented and the first set of visual effects are replaced with the second set of visual effects when the portion corresponding to the second voice modification effect is played back.

The voice modification effect module 520 can visually distinguish different regions of the progress bar to represent the multiple voice modification effects that are applied to different segments of the voice note. Namely, as shown in FIG. 8, the voice modification effect module 520 can display a first visual indicator 821 that represents a first voice modification effect in a region of the progress bar that corresponds to speech input modified by the first voice modification effect. The voice modification effect module 520 can display a second visual indicator 822 that represents a second voice modification effect in a region of the progress bar that corresponds to speech input modified by the second voice modification effect. If the participant is satisfied with the voice note that was generated, the communication session module 540 detects participant selection of the send voice note option displayed together with the progress bar 810.

Referring back to FIG. 7, if the participant is satisfied with the voice note that was generated, the communication session module 540 detects participant selection of the send icon 750. In response, the communication session module 540 sends the audio file with the modified speech input and one or more associated visual effects to the participants in the conversation session. An interactive visual indicator is presented among and/or between other messages exchanged in the communication session in response to receiving the audio file. The interactive visual indicator indicates that a voice note with modified speech input has been exchanged in the communication session. The interactive visual indicator can include a depiction or graphical representation of the voice modification effect (e.g., a picture of an alien or owl if the alien or owl was used to generate the voice note) and/or a time indicating the duration of the voice note associated with the interactive visual indicator.

In response to receiving a participant selection of the interactive visual indicator, the communication session module 540 obtains the audio file and the one or more visual effects and renders a presentation of the visual effects while playing back the audio file with the modified speech input.

Figure 9:
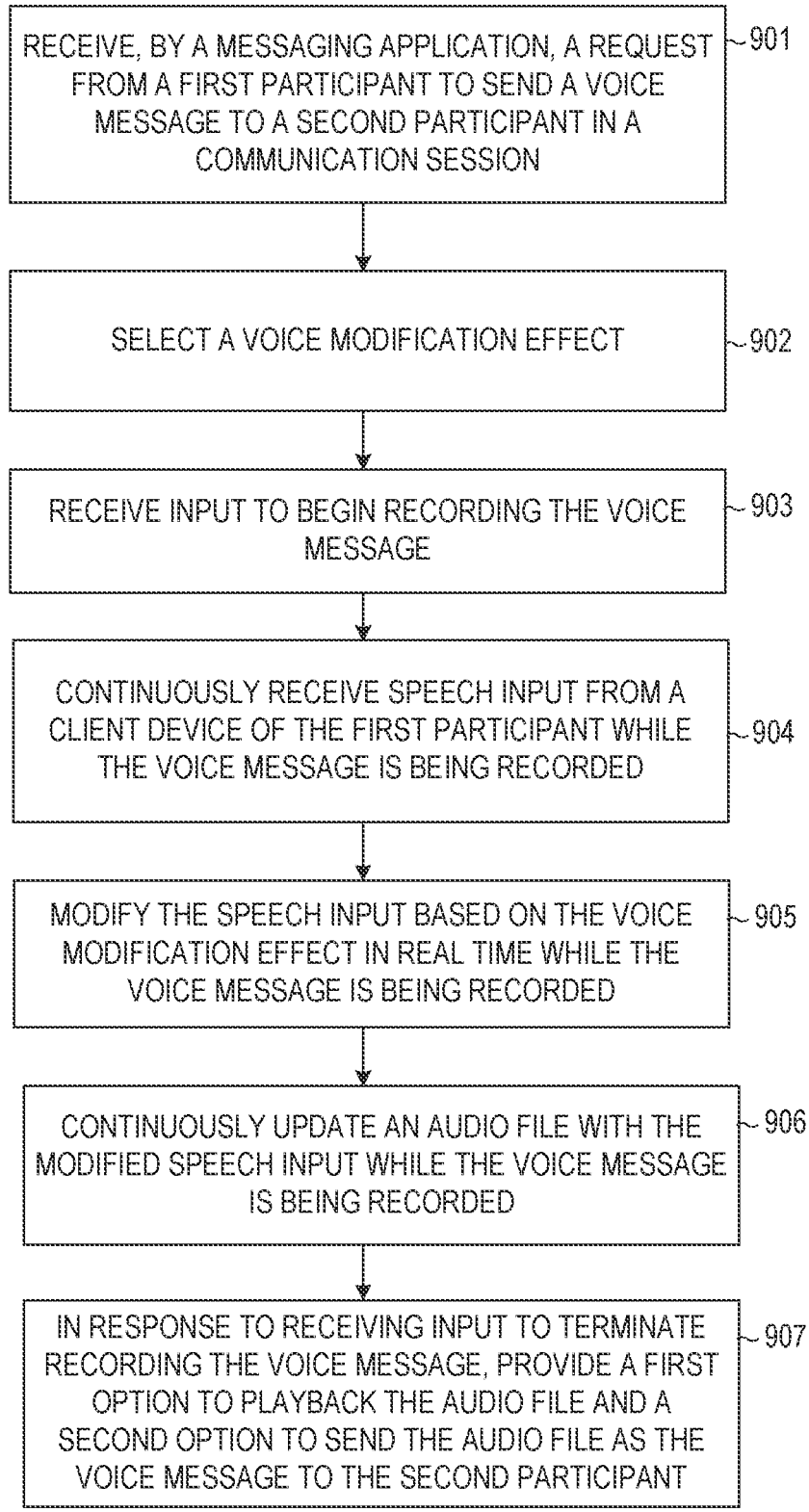
FIG. 9 is a flowchart illustrating example operations of the voice note generation system, in accordance with some examples.

FIG. 9 is a flowchart of a process 900 performed by the voice note generation system 224, in accordance with some example examples. Although the flowchart can describe the operations as a sequential process, many of the operations can be performed in parallel or concurrently. In addition, the order of the operations may be re-arranged. A process is terminated when its operations are completed. A process may correspond to a method, a procedure, and the like. The steps of methods may be performed in whole or in part, may be performed in conjunction with some or all of the steps in other methods, and may be performed by any number of different systems or any portion thereof, such as a processor included in any of the systems.

At operation 901, the voice note generation system 224 (e.g., a client device 102 or a server 114) receives, by a messaging application, a request from a first participant to send a voice message (voice note) to a second participant in a communication session, as discussed above. For example, the voice note generation system 224 can detect input that presses and holds the voice note indicator 642 to instruct the voice note generation system 224 to display an interface for generating a voice note.

At operation 902, the voice note generation system 224, in response to receiving the request, selects a voice modification effect, as discussed above. For example, the voice note generation system 224 displays an interface that includes a plurality of voice modification effects each represented by a different icon 610, 620 and 630.

At operation 903, the voice note generation system 224 continuously receives speech input from a client device of the first participant while the voice message is being recorded, as discussed above. For example, the voice modification effect module 520 receives speech input from the speech input module 510.

At operation 904, the voice note generation system 224 modifies the speech input based on the voice modification effect in real time while the voice message is being recorded, as discussed above. For example, the voice modification effect module 520 applies the selected voice modification effect to the speech input in real time, such as by changing voice characteristics of the speech input base don voice characteristics of the selected voice modification effect.

At operation 905, the voice note generation system 224 continuously updates an audio file with the modified speech input while the voice message is being recorded, as discussed above.

At operation 906, the voice note generation system 224 in response to receiving input to terminate recording the voice message, provides a first option to playback the audio file and a second option to send the audio file as the voice message to the second participant, as discussed above. For example, the voice modification effect module 520 displays an interface shown in FIG. 7 that includes the send icon 750 and a play icon 760.

Machine Architecture

Figure 10:
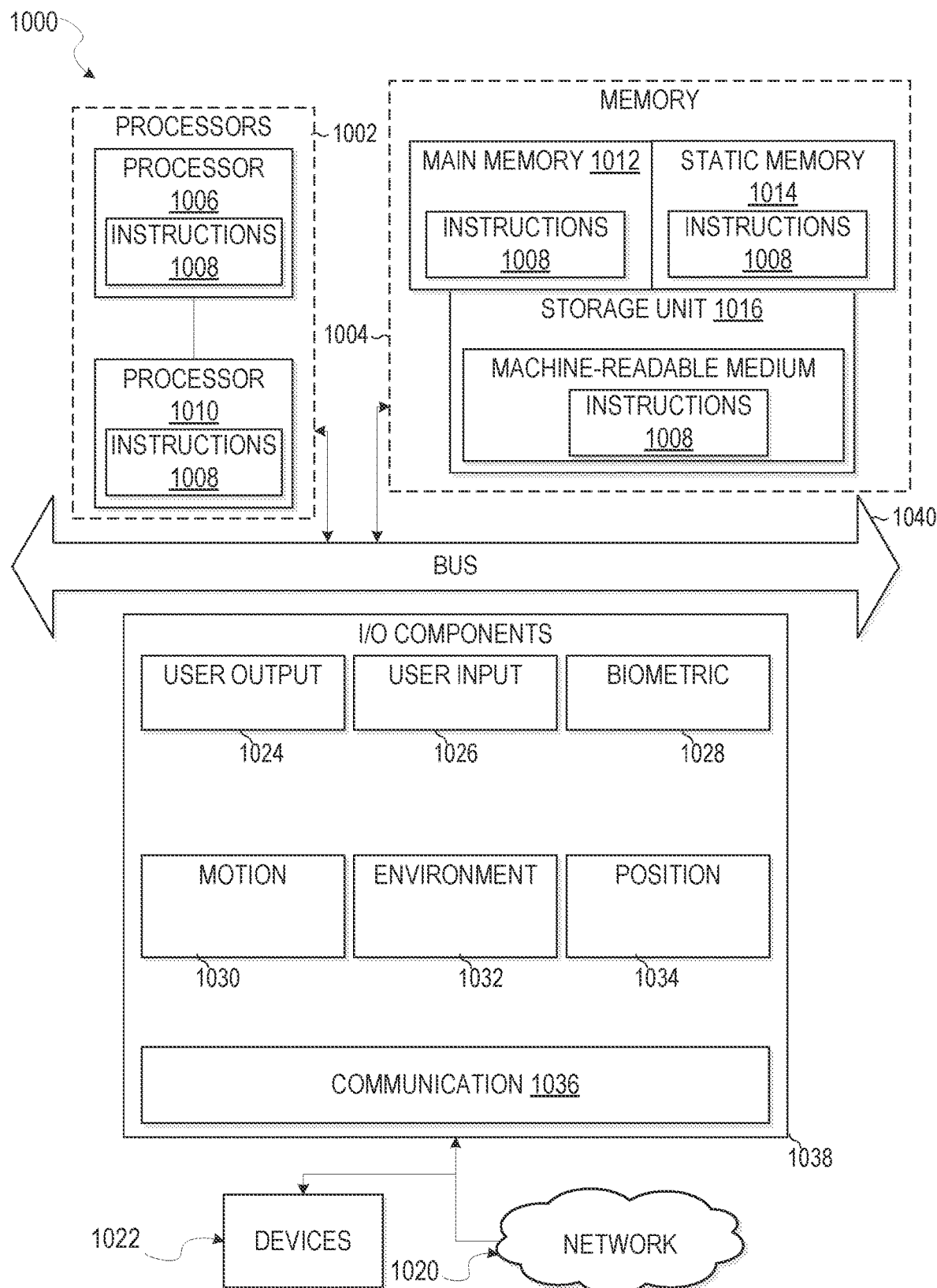
FIG. 10 is a diagrammatic representation of a machine in the form of a computer system within which a set of instructions may be executed for causing the machine to perform any one or more of the methodologies discussed herein, in accordance with some examples.

FIG. 10 is a diagrammatic representation of the machine 1000 within which instructions 1008 (e.g., software, a program, an application, an applet, an app, or other executable code) for causing the machine 1000 to perform any one or more of the methodologies discussed herein may be executed. For example, the instructions 1008 may cause the machine 1000 to execute any one or more of the methods described herein. The instructions 1008 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1008, sequentially or otherwise, that specify actions to be taken by the machine 1000. Further, while only a single machine 1000 is illustrated, the term "machine" shall also be taken to include a collection of machines that individually or jointly execute the instructions 1008 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1004, and input/output (I/O) components 1038, which may be configured to communicate with each other via a bus 1040. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1006 and a processor 1010 that execute the instructions 1008. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1004 includes a main memory 1012, a static memory 1014, and a storage unit 1016, all accessible to the processors 1002 via the bus 1040. The main memory 1004, the static memory 1014, and the storage unit 1016 store the instructions 1008 embodying any one or more of the methodologies or functions described herein. The instructions 1008 may also reside, completely or partially, within the main memory 1012, within the static memory 1014, within machine-readable medium within the storage unit 1016, within at least one of the processors 1002 (e.g., within the processor's cache memory), or any suitable combination thereof, during execution thereof by the machine 1000.

The I/O components 1038 may include a wide variety of components to receive input, provide output, produce output, transmit information, exchange information, capture measurements, and so on. The specific I/O components 1038 that are included in a particular machine will depend on the type of machine. For example, portable machines such as mobile phones may include a touch input device or other such input mechanisms, while a headless server machine will likely not include such a touch input device. It will be appreciated that the I/O components 1038 may include many other components that are not shown in FIG. 10. In various examples, the I/O components 1038 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1038 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, and rotation sensor components (e.g., gyroscope).

The environmental components 1032 include, for example, one or more cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 3600 camera for capturing 3600 photographs and videos.

Further, the camera system of a client device 102 may include dual rear cameras (e.g., a primary camera as well as a depth-sensing camera), or even triple, quad, or penta rear camera configurations on the front and rear sides of the client device 102. These multiple cameras systems may include a wide camera, an ultra-wide camera, a telephoto camera, a macro camera, and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1038 further include communication components 1036 operable to couple the machine 1000 to a network 1020 or devices 1022 via respective coupling or connections. For example, the communication components 1036 may include a network interface component or another suitable device to interface with the network 1020. In further examples, the communication components 1036 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1022 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® & signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1008), when executed by processors 1002, cause various operations to implement the disclosed examples.

The instructions 1008 may be transmitted or received over the network 1020, using a transmission medium, via a network interface device (e.g., a network interface component included in the communication components 1036) and using any one of several well-known transfer protocols (e.g., HTTP). Similarly, the instructions 1008 may be transmitted or received using a transmission medium via a coupling (e.g., a peer-to-peer coupling) to the devices 1022.

Software Architecture

Figure 11:
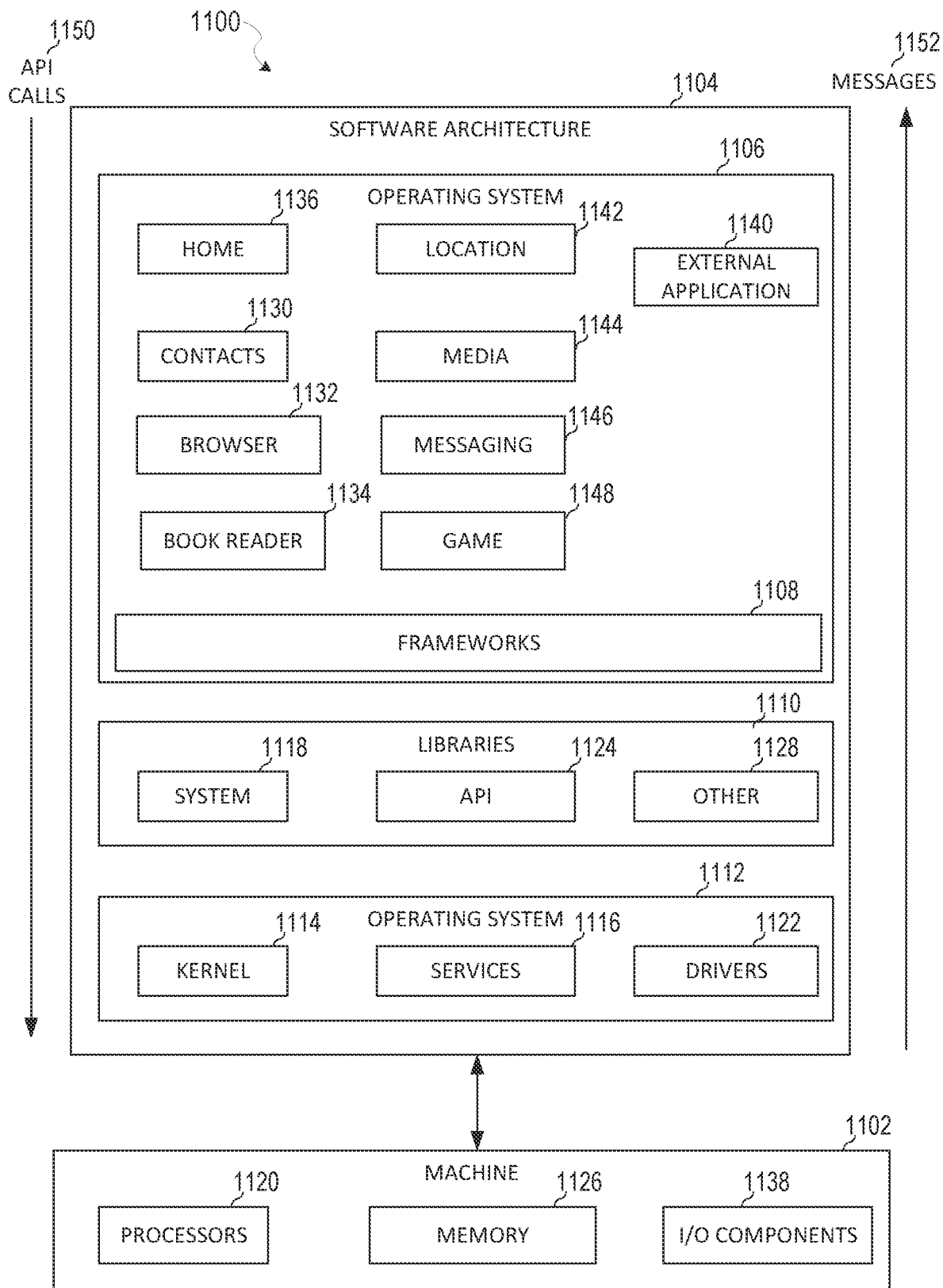
FIG. 11 is a block diagram showing a software architecture within which examples may be implemented.

FIG. 11 is a block diagram 1100 illustrating a software architecture 1104, which can be installed on any one or more of the devices described herein. The software architecture 1104 is supported by hardware such as a machine 1102 that includes processors 1120, memory 1126, and I/O components 1138. In this example, the software architecture 1104 can be conceptualized as a stack of layers, where each layer provides a particular functionality. The software architecture 1104 includes layers such as an operating system 1112, libraries 1110, frameworks 1108, and applications 1106. Operationally, the applications 1106 invoke API calls 1150 through the software stack and receive messages 1152 in response to the API calls 1150.

The operating system 1112 manages hardware resources and provides common services. The operating system 1112 includes, for example, a kernel 1114, services 1116, and drivers 1122. The kernel 1114 acts as an abstraction layer between the hardware and the other software layers. For example, the kernel 1114 provides memory management, processor management (e.g., scheduling), component management, networking, and security settings, among other functionalities. The services 1116 can provide other common services for the other software layers. The drivers 1122 are responsible for controlling or interfacing with the underlying hardware. For instance, the drivers 1122 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1110 provide a common low-level infrastructure used by applications 1106. The libraries 1110 can include system libraries 1118 (e.g., C standard library) that provide functions such as memory allocation functions, string manipulation functions, mathematic functions, and the like. In addition, the libraries 1110 can include API libraries 1124 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in 2D and 3D in a graphic content on a display), database libraries (e.g., SQLite to provide various relational database functions), web libraries (e.g., WebKit to provide web browsing functionality), and the like. The libraries 1110 can also include a wide variety of other libraries 1128 to provide many other APIs to the applications 1106.

The frameworks 108 provide a common high-level infrastructure that is used by the applications 1106. For example, the frameworks 1108 provide various graphical user interface functions, high-level resource management, and high-level location services. The frameworks 1108 can provide a broad spectrum of other APIs that can be used by the applications 1106, some of which may be specific to a particular operating system or platform.

In an example, the applications 1106 may include a home application 1136, a contacts application 1130, a browser application 1132, a book reader application 1134, a location application 1142, a media application 1144, a messaging application 1146, a game application 1148, and a broad assortment of other applications such as an external application 1140. The applications 1106 are programs that execute functions defined in the programs. Various programming languages can be employed to create one or more of the applications 1106, structured in a variety of manners, such as object-oriented programming languages (e.g., Objective-C, Java, or C++) or procedural programming languages (e.g., C or assembly language). In a specific example, the external application 1140 (e.g., an application developed using the ANDROID™ or IOS™ SDK by an entity other than the vendor of the particular platform) may be mobile software running on a mobile operating system such as IOS™, ANDROID™, WINDOWS® Phone, or another mobile operating system. In this example, the external application 1140 can invoke the API calls 1150 provided by the operating system 1112 to facilitate functionality described herein.

GLOSSARY

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistant (PDA), smartphone, tablet, ultrabook, netbook, laptop, multi-processor system, microprocessor-based or programmable consumer electronics, game console, set-top box, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1002 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium," and "device-readable medium" mean the same thing and may be used interchangeably in this disclosure.

"Ephemeral message" refers to a message that is accessible for a time-limited duration. An ephemeral message may be a text, an image, a video, and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines, and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," and "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A method comprising:
receiving, by a messaging application implemented on a first participant computing device, a request to send a voice message to a second participant computing device in a communication session;
in response to receiving the request, selecting a voice modification effect;
receiving first input comprising a touch and hold gesture on a first indicator of the voice modification effect, the first input causing initiating of recording the voice message;
while the voice message is being recorded:
receiving, in real time, speech input by the first participant computing device;
modifying the speech input based on the voice modification effect in real time as the speech input is received; and
continuously updating an audio file with the modified speech input; and
in response to receiving second input comprising a release of the touch and hold gesture on the first indicator, terminating recording of the voice message, providing a first option to playback the audio file and a second option to send the audio file as the voice message to the second participant computing device.

2. The method of claim 1, further comprising:
displaying a plurality of indicators corresponding to different voice modification effects, the plurality of indicators comprising the first indicator; and receiving input that selects the first indicator of the plurality of indicators corresponding to the voice modification effect that is selected.

3. The method of claim 2, wherein the first indicator of the plurality of indicators comprises a first image, video or animation that visually represents a first voice modification effect, wherein a second indicator of the plurality of indicators comprises a second image, video or animation that visually represents a second voice modification effect, and the first and second indicators are displayed simultaneously.

4. The method of claim 1, wherein the first indicator comprises an icon representing the voice modification effect that is in a first size, further comprising:
in response to receiving the first input, modifying the first indicator to simultaneously display a waveform inside of the first indicator, a visual indicator of the voice modification effect adjacent to the first indicator, and a timer representing a current duration of the voice message that is incremented as recording of the voice message progresses.

5. The method of claim 4, further comprising:
detecting a touch input comprising a swipe gesture along a specified direction to overlap a delete icon; and
in response to detecting the touch input comprising the swipe gesture along the specified direction to overlap the delete icon, terminating recording of the voice message and deleting the audio file.

6. The method of claim 4, wherein the waveform represents the received speech input, the visual indicator being a reduced size version of the icon representing the voice modification effect.

7. The method of claim 1, further comprising enlarging the first indicator relative to other indicators of other voice modification effects in response to selecting the voice modification effect.

8. The method of claim 1, further comprising:
playing back the audio file;
determining that the voice modification effect is associated with one or more visual effects; and
displaying the one or more visual effects while playing back the audio file in response to determining that the voice modification effect is associated with the one or more visual effects.

9. The method of claim 8, wherein the one or more visual effects are presented on a second participant computing device while the audio file is played back on the second participant computing device.

10. The method of claim 9, further comprising modifying an avatar of a first participant represented in a conversation interface of the communication session to visually depict the voice modification effect while the audio file is played back on the second participant computing device.

11. The method of claim 1, further comprising:
receiving a selection of a custom set of visual effects; and
associating the custom set of visual effects with the voice modification effect to cause one or more visual effects comprising the custom set of visual effects to be presented on a background of a conversation interface while the audio file is played back.

12. The method of claim 1, further comprising:
determining that the voice modification effect comprises an alien voice;
associating outer space related visual effects with the audio file in response to determining that the voice modification effect comprises the alien voice; and
causing a background of a second participant computing device to include the outer space related visual effects while the audio file comprising the alien voice is played back on the second participant computing device.

13. The method of claim 1, further comprising:
determining that the voice modification effect comprises a forest animal voice;
associating forest related visual effects with the audio file in response to determining that the voice modification effect comprises the forest animal voice; and
causing a background of a second participant computing device to include the forest related visual effects while the audio file comprising the forest animal voice is played back on the second participant computing device.

14. The method of claim 1, further comprising displaying an indicator of a specified duration of the speech input that is in the audio file.

15. The method of claim 14, further comprising:
receiving input that trims the audio file to modify the specified duration;
displaying a progress bar in response to receiving the input; and
visually representing the voice modification effect in the progress bar.

16. The method of claim 15, wherein the voice modification effect comprises a first voice modification effect, and further comprising:
selecting a second voice modification effect;
modifying a portion of the modified speech input stored in the audio file comprising the first voice modification effect with the second voice modification effect;
displaying a first portion of the progress bar corresponding to the first voice modification effect in a first manner; and
displaying a second portion of the progress bar corresponding to the second voice modification effect in a second manner.

17. The method of claim 16, further comprising:
receiving input that identifies the second portion of the progress bar; and
associating the second voice modification effect with the second portion of the progress bar in response to selecting the second voice modification effect.

18. The method of claim 1, wherein an interactive visual indicator of the voice message is displayed in line between a plurality of messages exchanged in the communication session.

19. A system comprising:
at least one processor; and
a memory component having instructions stored thereon that, when executed by the at least one processor, cause the at least one processor to perform operations comprising:
receiving, by a messaging application implemented on a first participant computing device, a request to send a voice message to a second participant computing device in a communication session;
in response to receiving the request, selecting a voice modification effect;
receiving first input comprising a touch and hold gesture on a first indicator of the voice modification effect, the first input causing initiating of recording the voice message;
while the voice message is being recorded:
receiving, in real time, speech input by the first participant computing device;

modifying the speech input based on the voice modification effect in real time as the speech input is received; and continuously updating an audio file with the modified speech input; and in response to receiving second input comprising a release of the touch and hold gesture on the first indicator, terminating recording of the voice message, providing a first option to playback the audio file and a second option to send the audio file as the voice message to the second participant computing device.

20. A non-transitory computer-readable storage medium having stored thereon instructions that, when executed by a processor, cause the processor to perform operations comprising:

receiving, by a messaging application implemented on a first participant computing device, a request to send a voice message to a second participant computing device in a communication session;

in response to receiving the request, selecting a voice modification effect;

receiving first input comprising a touch and hold gesture on a first indicator of the voice modification effect, the first input causing initiating of recording the voice message;

while the voice message is being recorded:

receiving, in real time, speech input by the first participant computing device;

modifying the speech input based on the voice modification effect in real time as the speech input is received; and continuously updating an audio file with the modified speech input; and in response to receiving second input comprising a release of the touch and hold gesture on the first indicator, terminating recording of the voice message, providing a first option to playback the audio file and a second option to send the audio file as the voice message to the second participant computing device.

\* \* \* \* \*